(12) United States Patent
Dehn et al.

(10) Patent No.: US 10,913,834 B2
(45) Date of Patent: Feb. 9, 2021

(54) POLYMER MATRIX COMPOSITES COMPRISING INDICATOR PARTICLES AND METHODS OF MAKING THE SAME

(71) Applicant: 3M INNOVATIVE PROPERTIES COMPANY, St. Paul, MN (US)

(72) Inventors: Derek J. Dehn, Woodbury, MN (US); Clinton P. Waller, Jr., White Bear Lake, MN (US); Bharat R. Acharya, Woodbury, MN (US); Satinder K. Nayar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 28 days.

(21) Appl. No.: 16/191,572

(22) Filed: Nov. 15, 2018

(65) Prior Publication Data
US 2019/0144626 A1    May 16, 2019

Related U.S. Application Data

(60) Provisional application No. 62/587,046, filed on Nov. 16, 2017.

(51) Int. Cl.
*C08J 9/00* (2006.01)
*G01N 21/78* (2006.01)
(Continued)

(52) U.S. Cl.
CPC .............. *C08J 9/0066* (2013.01); *C08J 3/14* (2013.01); *C08K 3/08* (2013.01); *C08K 3/30* (2013.01); *C08K 7/00* (2013.01); *C08K 9/02* (2013.01); *G01N 21/78* (2013.01); *C08J 2205/052* (2013.01); *C08J 2300/22* (2013.01); *C08K 3/04* (2013.01); *C08K 3/16* (2013.01); *C08K 3/34* (2013.01); *C08K 5/0041* (2013.01);
(Continued)

(58) Field of Classification Search
CPC ...................................................... C08J 9/0066
See application file for complete search history.

(56) References Cited

U.S. PATENT DOCUMENTS

| 3,954,927 A | 5/1976 | Duling |
| 4,539,256 A | 9/1985 | Shipman |

(Continued)

FOREIGN PATENT DOCUMENTS

| JP | 11176680 | 7/1999 |
| JP | 2002289414 | 10/2002 |

(Continued)

OTHER PUBLICATIONS

US 8,594,357 B1, 11/2013, Lin (withdrawn)
(Continued)

*Primary Examiner* — Marc S Zimmer

(57) ABSTRACT

A polymer matrix composite comprising a porous polymeric network; and a plurality of indicator particles distributed within the polymeric network structure; wherein the indicator particles are present in a range from 1 to 99 weight percent, based on the total weight of the indicator particles and the polymer (excluding the solvent); and wherein the polymer matrix composite has a density of at least 0.05 g/cm³; and methods for making the same. The polymer matrix composites are useful, for example, as sensors.

21 Claims, 2 Drawing Sheets

(51) Int. Cl.
*C08J 3/14* (2006.01)
*C08K 3/08* (2006.01)
*C08K 3/30* (2006.01)
*C08K 7/00* (2006.01)
*C08K 9/02* (2006.01)
*C08K 3/34* (2006.01)
*C08K 3/16* (2006.01)
*C08K 5/1535* (2006.01)
*G01N 21/77* (2006.01)
*C08K 3/04* (2006.01)
*C08K 5/00* (2006.01)
*C08K 5/098* (2006.01)

(52) U.S. Cl.
CPC ............ *C08K 5/098* (2013.01); *C08K 5/1535* (2013.01); *C08K 2003/0806* (2013.01); *C08K 2003/3045* (2013.01); *G01N 2021/773* (2013.01); *G01N 2021/7796* (2013.01)

(56) References Cited

U.S. PATENT DOCUMENTS

| | | | |
|---|---|---|---|
| 4,791,037 A | 12/1988 | Anderman | |
| 4,833,172 A | 5/1989 | Schwarz | |
| 4,957,943 A * | 9/1990 | McAllister | C08K 3/22 521/64 |
| 5,059,637 A | 10/1991 | Langer | |
| 5,120,154 A | 6/1992 | Lasch | |
| 5,124,129 A * | 6/1992 | Riccitelli | A61M 16/0488 128/207.14 |
| 5,292,840 A | 3/1994 | Heilmann | |
| 5,389,434 A | 2/1995 | Chamberlain | |
| 5,510,412 A | 4/1996 | Suzuki | |
| 5,567,757 A | 10/1996 | Szczepanski | |
| 5,643,511 A | 7/1997 | Pluyter | |
| 5,827,445 A | 10/1998 | Yoshida | |
| 5,828,940 A | 10/1998 | Learman | |
| 5,993,935 A | 11/1999 | Rasmussen | |
| 6,153,674 A | 11/2000 | Landen | |
| 6,171,723 B1 | 1/2001 | Loch | |
| 6,341,384 B1 | 1/2002 | Hayes | |
| 6,379,952 B1 | 4/2002 | Rasmussen | |
| 6,423,666 B1 | 7/2002 | Liao | |
| 6,458,418 B2 | 10/2002 | Langer | |
| 6,468,678 B1 | 10/2002 | Dahlin | |
| 6,524,742 B1 * | 2/2003 | Emanuel | H01G 9/155 429/129 |
| 6,548,972 B2 | 4/2003 | Takagi | |
| 6,558,840 B1 | 5/2003 | Hikmet | |
| 6,562,448 B1 | 5/2003 | Chamberlain | |
| 6,692,799 B2 | 2/2004 | Waller, Jr. | |
| 6,820,382 B1 | 11/2004 | Chambers | |
| 7,229,683 B2 | 6/2007 | Fisher | |
| 7,582,684 B2 | 9/2009 | Rasmussen | |
| 7,674,835 B2 | 3/2010 | Rasmussen | |
| 7,674,836 B2 | 3/2010 | Rasmussen | |
| 7,682,536 B2 | 3/2010 | Miller | |
| 7,709,098 B2 | 5/2010 | Yoda | |
| 7,744,991 B2 | 6/2010 | Fisher | |
| 7,940,447 B2 | 5/2011 | Wu | |
| 7,953,240 B2 | 5/2011 | Matsumura | |
| 7,955,570 B2 | 6/2011 | Insley | |
| 8,080,210 B2 | 12/2011 | Hornback, III | |
| 8,265,330 B2 | 9/2012 | Fukunishi | |
| 8,292,023 B2 | 10/2012 | Slotte | |
| 8,314,046 B2 | 11/2012 | Brady | |
| 8,335,333 B2 | 12/2012 | Saiki | |
| 8,367,198 B2 | 2/2013 | Wickert | |
| 8,522,829 B2 | 9/2013 | D'Souza | |
| 8,592,493 B2 | 11/2013 | Shannon | |
| 8,687,836 B2 | 4/2014 | Lin | |
| 8,692,639 B2 | 4/2014 | Baarman | |
| 8,698,394 B2 | 4/2014 | McCutcheon | |
| 8,710,111 B2 | 4/2014 | Wickert | |
| 8,767,998 B2 | 7/2014 | Imamura | |
| 8,794,373 B1 | 8/2014 | Lin | |
| 8,885,863 B2 | 11/2014 | Takashima | |
| 8,942,402 B2 | 1/2015 | Yuasa | |
| 8,974,706 B2 | 3/2015 | Somasiri | |
| 9,018,267 B2 | 4/2015 | Shannon | |
| 9,056,316 B2 | 6/2015 | Lawson | |
| 9,105,382 B2 | 8/2015 | Heikkila | |
| 9,251,950 B2 | 2/2016 | Hatanaka | |
| 9,657,038 B2 | 5/2017 | Griesgraber | |
| 9,675,722 B2 | 6/2017 | Ahimou | |
| 9,681,996 B2 | 6/2017 | Prioleau | |
| 9,714,442 B2 | 7/2017 | Sherman | |
| 9,725,545 B2 | 8/2017 | Wickert | |
| 9,738,919 B2 | 8/2017 | Mach | |
| 9,759,663 B2 | 9/2017 | Halverson | |
| 9,772,321 B2 | 9/2017 | Wendland | |
| 2002/0078793 A1 | 6/2002 | Holl | |
| 2006/0099454 A1 | 5/2006 | Morikoshi | |
| 2007/0086965 A1 | 4/2007 | Mohanty | |
| 2008/0286154 A1 * | 11/2008 | Kane | G01N 21/6428 422/82.08 |
| 2009/0215916 A1 * | 8/2009 | Krohnke | C08K 5/092 521/123 |
| 2011/0048844 A1 | 3/2011 | Papakyriacou | |
| 2011/0115429 A1 | 5/2011 | Toivola | |
| 2012/0183775 A1 | 7/2012 | Shinba | |
| 2013/0170687 A1 | 7/2013 | Papakyriacou | |
| 2013/0170690 A1 | 7/2013 | Backman | |
| 2014/0008974 A1 | 1/2014 | Miyamoto | |
| 2014/0254836 A1 | 9/2014 | Tong | |
| 2014/0309314 A1 | 10/2014 | Sahouani | |
| 2015/0099168 A1 | 4/2015 | Guo | |
| 2015/0235753 A1 | 8/2015 | Chatani | |
| 2016/0044838 A1 | 2/2016 | Aga | |
| 2016/0118711 A1 | 4/2016 | Finn | |
| 2017/0049926 A1 | 2/2017 | Langer-Anderson | |
| 2017/0117598 A1 | 4/2017 | Matsushita | |
| 2018/0038862 A1 | 2/2018 | Kshirsagar | |
| 2018/0174723 A1 | 6/2018 | Acharya | |

FOREIGN PATENT DOCUMENTS

| | | |
|---|---|---|
| JP | 2011199574 | 10/2011 |
| JP | 5522282 | 7/2013 |
| KR | 101627043 | 3/2016 |
| WO | WO 1992-06577 | 4/1992 |
| WO | WO 2001-41213 | 6/2001 |
| WO | WO 2009-006254 | 1/2009 |
| WO | WO 2012-040032 | 3/2012 |
| WO | WO 2016-149233 | 9/2016 |
| WO | WO 2016-178120 | 11/2016 |

OTHER PUBLICATIONS

Baker-Jarvis, Dielectric and Magnetic Properties of Printed Wiring Boards and Other Substrate Materials, United States Department of Commerce National Institute of Standards and Technology (NIST) Technical Note, Mar. 1, 1999, vol. 1512, 84 pages.

Oswald, Materials Science and Polymers for Engineers, 494-496, (2012).

Schaller, "High-Performance Polyethylene Fibers "Al Dente": Improved Gel-Spinning of Ultrahigh Molecular Weight Polyethylene Using Vegetable Oils", Macromolecules, 2015, vol. 48, No. 24, pp. 8877-8884.

Small, "Closed-Box Loudspeaker Systems", Journal of the Audio Engineering Society, Dec. 1972, vol. 20, No. 10, pp. 798-808.

* cited by examiner

POLYMER MATRIX COMPOSITES COMPRISING INDICATOR PARTICLES AND METHODS OF MAKING THE SAME

CROSS REFERENCE TO RELATED APPLICATION

This application claims the benefit of U.S. Provisional Patent Application No. 62/587,046, filed Nov. 16, 2017, the disclosure of which is incorporated by reference herein in its entirety.

BACKGROUND

Typically, methods for detection and analysis of analytes (e.g., protein, bacteria, gases, or wetness) require specialized equipment and a skilled user capable of interpreting results. Formulations including dyes and catalysts or curatives in which, for example, color changes, disappears, or appears upon some form of contact with media providing, for example, a visual indication of contamination, reaction completion, light exposure, or analyte presence, are widely used. The color change may be visible under ordinary visible light conditions or may be visible outside of visible light conditions, such as under ultraviolet (UV) conditions. For example, some color changing indicators cause florescence that is only visible under UV light. The detection of these wanted, or unwanted, analytes (e.g., protein, bacteria, or wetness), which does not require expensive analytical equipment or extensive interpretation, is desirable.

What are also desired are new materials and methods for creating colorimetric sensor element that provides results rapidly, has shelf life stability, is simple to use, can capture dilute analytes, and is inexpensive.

SUMMARY

In one aspect, the present disclosure describes a polymer matrix composite comprising:

a porous polymeric network structure; and a plurality of indicator particles distributed within the polymeric network structure, wherein the indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the indicator particles and the polymer (excluding any solvent) and wherein the polymer matrix composite has a density of at least 0.05 (in some embodiments, at 0.05 to 4 (in some embodiments, in a range from 0.05 to 4, 0.05 to 3, 0.05 to 2.5, 0.05 to 2, 0.05 to 1, or even 0.05 to 0.2) g/cm$^3$ uncompressed, as-made or at least 1 (in some embodiments, at least 4, or even at least 6; in some embodiments, in a range from 1 to 6, or even 4 to 6) g/cm$^3$ after compression. "Indicator particles," as used herein, refer to particles which provide a detectible change in at least one of optical, ultraviolet (UV), infrared (IR), mechanical, chemical, or electrical properties after exposure to a stimulant (e.g., moisture, pH, proteins, temperature, pressure, or gases).

In some embodiments, the detectible change of the polymeric matrix composites is improved by compressing the polymeric matrix composite, thereby increasing the density of the polymer matrix composite.

In another aspect, the present disclosure describes a first method of making polymer matrix composites described herein, the method comprising:

combining (e.g., mixing or blending) a thermoplastic polymer, a solvent, and a plurality of indicator particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

In another aspect, the present disclosure describes a second method of making polymer matrix composites described herein, the method comprising:

combining (e.g., mixing or blending) a thermoplastic polymer, a solvent for the thermoplastic polymer, and a plurality of indicator particles to form a suspension of indicator particles in a miscible thermoplastic polymer-solvent solution;

inducing phase separation of the thermoplastic polymer from the solvent; and removing at least a portion of the solvent to provide the polymer matrix composite.

"Miscible" as used herein refers to the ability of substances to mix in all proportions (i.e., to fully dissolve in each other at any concentration), forming a solution, wherein for some solvent-polymer systems heat may be needed for the polymer to be miscible with the solvent. By contrast, substances are immiscible if a significant proportion does not form a solution. For example, butanone is significantly soluble in water, but these two solvents are not miscible because they are not soluble in all proportions.

"Phase separation," as used herein, refers to the process in which particles are uniformly dispersed in a homogeneous polymer-solvent solution that is transformed (e.g. by a change in temperature or solvent concentration) into a continuous three-dimensional polymer matrix composite. In the first method, the desired article is formed before the polymer becomes miscible with the solvent and the phase separation is a thermally induced phase separation (TIPS) process. In the second method, the polymer is miscible with the solvent before the desired article is formed. In the second method, phase separation is achieved via solvent induced phase separation (SIPS) using a wet or dry process, or thermally induced phase separation methods.

In the SIPS wet process, the solvent dissolving the polymer is exchanged with a nonsolvent to induce phase separation. The new exchanging solvent in the system becomes the pore former for the polymer. In the SIPS dry process, the solvent dissolving the polymer is evaporated to induce phase separation. In the dry process, a nonsolvent is also solubilized in the solution by the solvent dissolving the polymer. This nonsolvent for the polymer becomes the pore former for the polymer as the solubilizing solvent evaporates. The process is considered a "dry process" because no additional exchange liquids are used. The nonsolvent is also normally volatile but has a boiling point at least 30° C. lower than the solvent.

In the TIPS process, elevated temperature is used to make a nonsolvent become a solvent for the polymer, then the temperature is lowered returning the solvent to a nonsolvent for the polymer. Effectively, the hot solvent becomes the pore former when sufficient heat is removed and it loses its solvating capacity. The solvent used in the thermal phase separation process can be volatile or nonvolatile.

Surprisingly, in the first method to make a polymer matrix composite, the relatively high particle loadings allow a slurry to be made that can be shaped into a layer, that maintains its form as the solvent is heated to become miscible with the polymer. The solvent used is normally volatile and is later evaporated. In the second method using TIPS process to make a polymer matrix composite, the solvent used is normally nonvolatile. In the second method to make a polymer matrix composite by the wet or dry SIPS process, the solvents are normally nonvolatile for the wet process and volatile for the dry process.

Typically, the maximum particle loading that can be achieved in traditional particle-filled composites (dense polymeric films, adhesives, etc.), is not more than about 40 to 60 vol. %, based on the volume of the particles and binder. Incorporating more than 60 vol. % particles into traditional particle filled composites typically is not achievable because such high particle loaded materials cannot be processed via coating or extrusion methods and/or the resulting composite becomes very brittle. Traditional composites also typically fully encapsulate the particles with binder preventing access to the particle surfaces and minimizing potential particle-to-particle contact. Surprisingly, the high levels of solvent and the phase separated morphologies obtained with the methods described herein enable relatively high particle loadings with relatively low amounts of high molecular weight binder. The high particle loading also helps minimize the formation of thin non-porous polymer layer that can form during phase separation. Moreover, the polymer matrix composites described herein are relatively flexible, and tend not to shed particles. Although not wanting to be bound by theory, it is believed that another advantage of embodiments of polymer matrix composites described herein, is the particles are not fully coated with binder enabling a high degree of particle surface contact without masking due to the porous nature of the binder. It should be noted that compression of the layer can significantly enhance the particle to particle contact. The high molecular weight binder also does not readily flow in the absence of solvent, even at elevated temperatures (e.g., 135° C.).

Polymer matrix composites comprising indicator particles are useful, for example, as sensors (e.g., end-of-service-life indicator for respirator cartridges, protein detection, pH measurement, pressure sensing, or moisture indicators).

DETAILED DESCRIPTION

Figure 1:
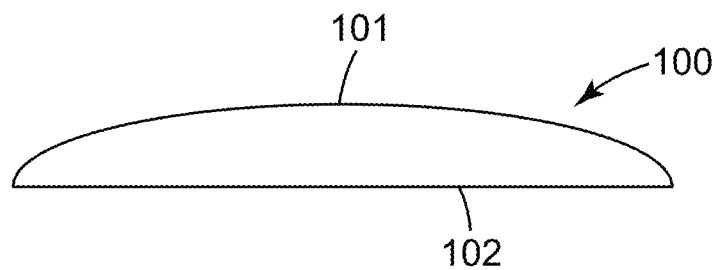
FIG. 1 is a schematic of an exemplary polymer matrix composite described herein.

The indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the indicator particles and the polymer (excluding any solvent).

Exemplary indicator particles include color changing particles (e.g., phenolphthalein (pH indicator)), salts (e.g., cobalt chloride (moisture indicator) copper II sulfate (protein indicator), lead acetate (hydrogen sulfide gas detector)), metals (e.g. silver (hydrogen sulfide gas detector)), metal coated particles (e.g., silver coated particles (hydrogen sulfide gas detector)), zeolite, and activated carbon (chemical absorbing followed by analytical measurement using high performance liquid chromatography (HPLC), and gas chromatography (GC) for quantitation). The color change may be visible under ordinary visible light conditions or may be visible outside of visible light conditions, such as under UV conditions. For example, some color changing indicators cause florescence that is only visible under UV light.

Exemplary sizes of the indicator particles range from 100s of nanometers to 100s of micrometers in size. Exemplary shapes of the indicator particles include irregular, platy, acicular, spherical shapes, and as well as agglomerated forms. Agglomerates can range in size, for example, from a few micrometers up to and including a few millimeters.

In some embodiments, the indicator particles have an average particle size (average length of longest dimension) in a range from 1 to 5000 (in some embodiments, in a range from 5 to 100, 10 to 50, or even, 20 to 40) micrometers.

In some embodiments, the indicator particles comprise first and second, different (i.e., different compositions or microstructures, or particle sizes) indicator particles. Different indicator particles may be desired to allow a broader detection range for applications (e.g., measuring pH where it is desirable to have different color responses based on different pH ranges). In some embodiments, it is desirable for an indicator to respond to exposure from multiple analytes (e.g., organic vapors and acid gases for use as an end-of-service-life indicator for a respirator cartridge).

In some embodiments, the first indicator particles comprise color changing particles (e.g., phenolphthalein (pH indicator)), salts (e.g., cobalt chloride (moisture indicator), copper II sulfate (protein indicator)), lead acetate (hydrogen sulfide gas detector), metal (e.g., silver (hydrogen sulfide gas detector)), metal coated particles (e.g., silver coated particles (hydrogen sulfide gas detector)), zeolite, and activated carbon (chemical absorbing), and wherein the second indicator particles comprise color changing particles (e.g., phenolphthalein (pH indicator)), salts (e.g., cobalt chloride (moisture indicator), copper II sulfate (protein indicator)), metal (e.g., silver (hydrogen sulfide gas detector)), metal coated particles (e.g., silver coated particles (hydrogen sulfide gas detector), zeolite, and activated carbon (chemical absorbing)).

In some embodiments, the first indicator particles have an average particle size (average length of longest dimension) in a range from 1 to 5000 (in some embodiments, in a range from 5 to 100, 10 to 50, or even, 20 to 40) micrometers and the second indicator particles have an average particle size (average length of longest dimension) in a range from 1 to 5000 (in some embodiments, in a range from 5 to 100, 10 to 50, or even, 20 to 40) micrometers.

In some embodiments, the first indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent and the second indicator particles are present in a range from 99 to 1 (in some embodiments, in a range from 95 to 1, 90 to 1, 95 to 2, 90 to 2, 75 to 2, 50 to 2, 40 to 2, 30 to 2, 20 to 2, 10 to 2, 7 to 2, or even 5 to 2) weight percent, based on the total weight of the first and second indicator particles.

In some embodiments, polymer matrix composite described herein further comprising nonindicator particles. In some embodiments, the nonindicator particles comprise at least one of inorganic or organic material which do not provide a detectable change after exposure. Nonindicator particles can be used as spacers to prevent pore collapse from the heating or drying steps. They can also be used to dilute the response of the indicator particles. They can also act as thickeners to increase viscosity during forming.

In some embodiments, the nonindicator particles have an average particle size (average length of longest dimension) in a range from 0.005 to 5000 (in some embodiments, in a range from 0.005 to 500, 0.1 to 200, or even 5 to 60) micrometers.

In some embodiments, the nonindicator particles are present in a weight fraction in a range from 1 to 99 (in some embodiments, in a range from 1 to 90, 1 to 50, 1 to 20, or even 1 to 10), based on the total weight of the polymer matrix composite.

As-made polymer matrix composites described herein (i.e., prior to any compression or other post formation densification) typically have a density of in a range from 0.05 to 4 (in some embodiments, in a range from 0.05 to 3, 0.05 to 2.5, 0.05 to 2, 0.05 to 1, or even 0.05 to 0.2) g/cm$^3$.

In some embodiments, compressed polymer matrix composites have a density of at least 1 (in some embodiments, at least 4, or even at least 6; in some embodiments, in the range from 1 to 6, or even 4 to 6) g/cm$^3$.

In some embodiments, polymer matrix composites described herein have a porosity of at least 5 (in some embodiments, at least 10, 20, 30, 35, 40, 45, 50, 55, 60, 65, 70, 75, 80, 85, or even at least 90; in some embodiments, in a range for 25 to 90) percent.

The polymeric network structure may be described as a porous polymeric network or a porous phase separated polymeric network. Generally, the porous polymeric network (as-made) includes an interconnected porous polymeric network structure comprising a plurality of interconnected morphologies (e.g., at least one of fibrils, nodules, nodes, open cells, closed cells, leafy laces, strands, nodes, spheres, or honeycombs). The interconnected polymeric structures may adhere directly to the surface of the particles and act as a binder for the particles. In this regard, the space between adjacent particles (e.g., particles or agglomerate particles) may include porous polymeric network structures, as opposed to a solid matrix material, thereby providing desired porosity.

In some embodiments, the polymeric network structure may include a 3-dimensional reticular structure that includes an interconnected network of polymeric fibrils. In some embodiments, individual fibrils have an average width in a range from 10 nm to 100 nm (in some embodiments, in a range from 100 nm to 500 nm, or even 500 nm to 5 micrometers).

In some embodiments, the particles are dispersed within the polymeric network structure, such that an external surface of the individual units of the particles (e.g., individual particles or individual agglomerate particles) is mostly uncontacted, or uncoated, by the polymeric network structure. In this regard, in some embodiments, the average percent areal coverage of the polymeric network structure on the external surface of the individual particles (i.e., the percent of the external surface area that is in direct contact with the polymeric network structure) is not greater than 50 (in some embodiments, not greater than 40, 30, 25, 20, 10, 5, or even not greater than 1) percent, based on the total surface area of the external surfaces of the individual particles.

In some embodiments, the polymeric network structure does not penetrate internal porosity or internal surface area of the individual particles (e.g., individual particles or individual agglomerate particles are mostly uncontacted, or uncoated, by the polymeric network structure).

In some embodiments, the polymeric network structure may comprise, consist essentially of, or consist of at least one thermoplastic polymer. Exemplary thermoplastic polymers include polyurethane, polyester (e.g., polyethylene terephthalate, polybutylene terephthalate, and polylactic acid), polyamide (e.g., nylon 6, nylon 6,6, nylon 12 and polypeptide), polyether (e.g., polyethylene oxide and polypropylene oxide), polycarbonate (e.g., bisphenol-A-polycarbonate), polyimide, polysulphone, polyethersulphone, polyphenylene oxide, polyacrylate (e.g., thermoplastic polymers formed from the addition polymerization of monomer(s) containing an acrylate functional group), polymethacrylate (e.g., thermoplastic polymers formed from the addition polymerization of monomer(s) containing a methacrylate functional group), polyolefin (e.g., polyethylene and polypropylene), styrene and styrene-based random and block copolymer, chlorinated polymer (e.g., polyvinyl chloride), fluorinated polymer (e.g., polyvinylidene fluoride; copolymers of tetrafluoroethylene, hexafluoropropylene and vinylidene fluoride; copolymers of ethylene, tetrafluoroethylene; hexafluoropropylene; and polytetrafluoroethylene), and copolymers of ethylene and chlorotrifluoroethylene. In some embodiments, thermoplastic polymers include homopolymers or copolymers (e.g., block copolymers or random copolymers). In some embodiments, thermoplastic polymers include a mixture of at least two thermoplastic polymer types (e.g., a mixture of polyethylene and polypropylene or a mixture of polyethylene and polyacrylate). In some embodiments, the polymer may be at least one of polyethylene (e.g., ultra-high molecular weight polyethylene), polypropylene (e.g., ultra-high molecular weight polypropylene), polylactic acid, poly(ethylene-co-chlorotrifluoroethylene) and polyvinylidene fluoride. In some embodiments, the thermoplastic polymer is a single thermoplastic polymer (i.e., it is not a mixture of at least two thermoplastic polymer types). In some embodiments, the thermoplastic polymers consist essentially of, or consist of polyethylene (e.g., ultra-high molecular weight polyethylene).

In some embodiments, the thermoplastic polymer used to make the polymer matrix composites described herein are particles having a particle size less than 1000 (in some embodiments in the range from 1 to 10, 10 to 30, 30 to 100, 100 to 200, 200 to 500, 500 to 1000) micrometers.

In some embodiments, the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

In some embodiments, the porous polymeric network structure comprises a polymer having a number average molecular weight in a range from $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol. For purposes of the present disclosure, the number average molecular weight can be measured by known techniques in the art (e.g., gel permeation chromatography (GPC)). GPC may be conducted in a suitable solvent for the thermoplastic polymer, along with the use of narrow molecular weight distribution polymer standards (e.g., narrow molecular weight distribution polystyrene standards). Thermoplastic polymers are generally characterized as being partially crystalline, exhibiting a melting point. In some embodiments, the thermoplastic polymer may have a melting point in a range from 120 to 350 (in some embodiments, in a range from 120 to 300, 120 to 250, or even 120 to 200) ° C. The melting point of the thermoplastic polymer can be measured by known techniques in the art (e.g., the on-set temperature measured in a differential scanning calorimetry (DSC) test, conducted with a 5 to 10 mg sample, at a heating scan rate of 10° C./min., while the sample is under a nitrogen atmosphere).

In some embodiments, the polymeric network structure is a continuous network structure (i.e., the polymer phase comprises a structure that is open cell with continuous voids or pores forming interconnections between the voids, extending throughout the structure). In some embodiments, at least 2 (in some embodiments, at least 5, 10, 20, 30, 40, 50, 60, 70, 80, 90, 95, or even, 100) percent of the polymer network structure, by volume, may be a continuous polymer network structure. It should be noted that for purposes of the present disclosure, the portion of the volume of the polymer matrix composite made up of the particles is not considered part of the polymeric network structure. In some embodiments, the polymer network extends between two particles forming a network of interconnected particles.

The solvent (e.g., a first solvent) is selected such that it forms a miscible polymer-solvent solution. In some cases, elevated temperatures may be required to form the miscible polymer-solvent solution. The solvent may be a blend of at least two individual solvents. In some embodiments, when the polymer is a polyolefin (e.g., at least one of polyethylene and polypropylene), the solvent may be, for example, at least one of mineral oil, tetralin, decalin, orthodichlorobenzene, cyclohexane-toluene mixture, dodecane, paraffin oil/wax, kerosene, isoparaffinic fluids, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent may be, for example, at least one of ethylene carbonate, propylene carbonate, or 1,2,3 triacetoxypropane. The solvent may be removed, for example, by evaporation. High vapor pressure solvents being particularly suited to this method of removal. If, however, the first solvent has a low vapor pressure, it may be desirable to have a second solvent, of higher vapor pressure, to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.), may be used as the second solvent. In some embodiments, when ethylene carbonate is used as the first solvent, water may be used as the second solvent.

In some embodiments, small quantities of other additives can be added to the polymer matrix composite to impart additional functionality or act as processing aids. These include viscosity modifiers (e.g., fumed silica, block copolymers, and wax), plasticizers, thermal stabilizers (e.g., such as available, for example, under the trade designation "IRGANOX 1010" from BASF, Ludwigshafen, Germany), antimicrobials (e.g., silver and quaternary ammonium), flame retardants, antioxidants, dyes, pigments, and ultraviolet (UV) stabilizers.

In some embodiments, polymer matrix composites described herein, are in the form of a layer having a thickness in a range from 50 to 7000 micrometers, wherein the thickness excludes the height of any protrusions extending from the base of the layer.

In some embodiments, the porous polymeric network structure is produced by an induced phase separation of a miscible thermoplastic polymer-solvent solution. In some embodiments, induced phase separation is at least one of thermally induced phase separation or solvent induced phase separation.

First Method

A first method of making polymer matrix composites described herein comprises:

combining (e.g., mixing or blending) a thermoplastic polymer, a solvent, and a plurality of indicator particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

If the particles are dense, typically the slurry is continuously mixed or blended to prevent or reduce settling or separation of the polymer and/or particles from the solvent. In some embodiments, the slurry is degassed using techniques known in the art to remove entrapped air.

The slurry can be formed in to an article using techniques known in the art, including knife coating, roll coating (e.g., roll coating through a defined nip), and coating through any number of different dies having the appropriate dimensions or profiles.

In some embodiments of the first method, combining is conducted at temperature below the melting point of the polymer and below the boiling point of the solvent.

In some embodiments of the first method, heating is conducted at at least one temperature above the melting point of the miscible thermoplastic polymer-solvent solution, and below the boiling point of the solvent.

In some embodiments of the first method, inducing phase separation is conducted at at least one temperature less than the melting point of the polymer in the slurry. Although not wanting to be bound, it is believed that in some embodiments, solvents used to make a miscible blend with the polymer can cause melting point depression in the polymer. The melting point described herein includes below any melting point depression of the polymer solvent system.

In some embodiments of the first method, the solvent is a blend of at least two individual solvents. In some embodiments, when the polymer is a polyolefin (e.g., at least one of polyethylene or polypropylene), the solvent may be at least one of mineral oil, tetralin, decalin, 1,2-orthodichlorobenzene, cyclohexane-toluene mixture, dodecane, paraffin oil/ wax, kerosene, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments of the first method, the polymeric network structure may be formed during phase separation. In some embodiments, the polymeric network structure is provided by an induced phase separation of a miscible thermoplastic polymer-solvent solution. In some embodiments, the phase separation is induced thermally (e.g., via thermally induced phase separation (TIPS) by quenching to a lower temperature than used during heating). Cooling can be provided, for example, in air, liquid, or on a solid interface, and varied to control the phase separation. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the method described herein, the weight ratio of solvent to polymer is at least 9:1. In some embodiments, the volume ratio of particles to polymer is at least 9:1. In some embodiments, and for ease of manufacturing, it may be desirable to form a layer at room temperature. Typically, during the layer formation using phase separation, relatively small pores are particularly vulnerable to collapsing during solvent extraction. The relatively high particle to polymer loading achievable by the methods described herein may reduce pore collapsing and yield a more uniform defect-free polymer matrix composite.

In some embodiments, the first method further comprises removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100 percent by weight of the solvent, based on the weight of the solvent in the formed article) of the solvent from the formed article after inducing phase separation of the thermoplastic polymer from the solvent.

In some embodiments of the first method, at least 90 percent by weight of the solvent, based on the weight of the solvent in the formed article, is removed, wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent. Volatile solvents can be removed from the polymer matrix composite, for example, by allowing the solvent to evaporate from at least one major surface of the polymer matrix composite. Evaporation can be aided, for example, by the addition of at least one of heat, vacuum, or air flow. Evaporation of flammable solvents can be achieved in a solvent-rated oven. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethyl-nonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

In some embodiments of the first method, the article has first and second major surfaces with ends perpendicular to the first and second major surfaces, and the ends are unrestrained (i.e., without the need for restraints during extraction or stretching) during the solvent removal. This can be done, for example, by drying a portion of a layer without restraint in an oven. Continuous drying can be achieved, for example, by drying a long portion of a layer supported on a belt as it is conveyed through an oven. Alternatively, to facilitate removal of non-volatile solvents, for example, a long portion of a layer can be continuously conveyed through a bath of compatible volatile solvent thereby exchanging the solvents and allowing the layer to be subsequently dried without restraint. Not all the non-volatile solvent, however, need be removed from the layer during the solvent exchange. Small amounts of non-volatile solvents may remain and act as a plasticizer to the polymer.

In some embodiments of the first method, the formed, and phase separated article after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent. This porosity is caused by the phase separation of the polymer from the solvent which initially leaves no unfilled voids, as the pores in the polymer matrix composite are filled with solvent. After the solvent is completely or partly removed, or the article is stretched, void spaces in the polymer matrix composite are exposed. The particle-to-particle interactions can minimize the collapse or deformation of the porous polymer matrix composite from capillary-induced negative pressures from the solvent drying process.

In some embodiments of the first method, no solvent is removed from the formed article (even after inducing phase separation of the thermoplastic polymer from the solvent). This can be accomplished, for example, by using a non-volatile solvent (e.g., mineral oil or wax) and not completing the extraction/evaporation step. If unfilled porosity is required for the solvent containing composites, then they can optionally be stretched to open up pores within the polymer and solvent matrix.

Second Method

A second method of making polymer matrix composites described herein comprises:

combining (e.g., mixing or blending) a thermoplastic polymer, a solvent for the thermoplastic polymer, and a plurality of indicator particles to form a suspension of indicator particles in a miscible thermoplastic polymer-solvent solution;

inducing phase separation of the thermoplastic polymer from the solvent; and removing at least a portion of the solvent to provide the polymer matrix composite.

In some embodiments, the second method further comprises adding the indicator particles to the miscible polymer-solvent solution, prior to phase separation. The polymeric network structure may be formed during the phase separation of the process. In some embodiments, the polymeric network structure is provided via an induced phase separation of a miscible thermoplastic polymer-solvent solution. In some embodiments, the phase separation is induced thermally (e.g., via thermally induced phase separation (TIPS) by quenching to lower temperature), chemically (e.g., via solvent induced phase separation (SIPS) by substituting a poor solvent for a good solvent), or change in the solvent ratio (e.g., by evaporation of one of the solvents). Other phase separation or pore formation techniques known in the art, such as discontinuous polymer blends (also sometimes referred to as polymer assisted phase inversion (PAPI)), moisture induced phase separation, or vapor induced phase separation, can also be used. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the second method, the polymer in the miscible thermoplastic polymer-solvent solution has a melting point, wherein the solvent has a boiling point, and wherein combining is conducted at at least one temperature above the melting point of the miscible thermoplastic polymer-solvent solution, and below the boiling point of the solvent.

In some embodiments of the second method, the polymer in the miscible thermoplastic polymer-solvent solution has a melting point, and wherein inducing phase separation is conducted at at least one temperature less than the melting point of the polymer in the miscible thermoplastic polymer-solvent solution. The thermoplastic polymer-solvent mixture may be heated to facilitate the dissolution of the thermoplastic polymer in the solvent. After the thermoplastic polymer has been phase separated from the solvent, at least a portion of the solvent may be removed from the polymer matrix composite using techniques known in the art, including evaporation of the solvent or extraction of the solvent by a higher vapor pressure, second solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

The solvent is typically selected such that it is capable of dissolving the polymer and forming a miscible polymer-solvent solution. Heating the solution to an elevated temperature may facilitate the dissolution of the polymer. In some embodiments, combining the polymer and solvent is conducted at at least one temperature in a range from 20° C. to 350° C. The indicator particles may be added at any or all of the combining, before the polymer is dissolved, after the polymer is dissolved, or at any time therebetween.

In some embodiments, the solvent is a blend of at least two individual solvents. In some embodiments, when the polymer is a polyolefin (e.g., at least one of polyethylene or polypropylene), the solvent may be at least one of mineral oil, paraffin oil/wax, camphene, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments, the solvent may be removed, for example, by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

Typically, in the phase separation process, the blended mixture is formed in to a layer prior to solidification of the polymer. The polymer is dissolved in solvent (that allows formation of miscible thermoplastic-solvent solution), and the indicator particles dispersed to form a blended mixture, that is formed into an article (e.g., a layer), followed by phase separation (e.g., temperature reduction for TIPS, solvent evaporation or solvent exchange with nonsolvent for SIPS). The layer-forming may be conducted using techniques known in the art, including, knife coating, roll coating (e.g., roll coating through a defined nip), and extrusion (e.g., extrusion through a die (e.g., extrusion through a die having the appropriate layer dimensions (i.e., width and thickness of the die gap))). In one exemplary embodiment, the mixture has a paste-like consistency and is formed in to a layer by extrusion (e.g., extrusion through a die having the appropriate layer dimensions (i.e., width and thickness of the die gap)).

After forming the slurry in to a layer, where the thermoplastic polymer is miscible in its solvent, the polymer is then induced to phase separate. Several techniques may be used to induce phase separation, including at least one of thermally induced phase separation or solvent induced phase separation. Thermally induced phase separation may occur when the temperature at which induced phase separation is conducted is lower than the combining temperature of the polymer, solvent, and indicator particles. This may be achieved by cooling the miscible polymer-solvent solution, if combining is conducted near room temperature, or by first heating the miscible polymer-solvent solution to an elevated temperature (either during combining or after combining), followed by decreasing the temperature of the miscible polymer-solvent solution, thereby inducing phase separation of the thermoplastic polymer. In both cases, the cooling may cause phase separation of the polymer from the solvent. Solvent induced phase separation can be conducted by adding a second solvent, a poor solvent for the polymer, to the miscible polymer-solvent solution or may be achieved by removing at least a portion of the solvent of the miscible polymer-solvent solution (e.g., evaporating at least a portion of the solvent of the miscible polymer-solvent solution), thereby inducing phase separation of the polymer. Combination of phase separation techniques (e.g., thermally induced phase separation and solvent induced phase separation), may be employed. Thermally induced phase separation, may be advantageous, as it also facilitates the dissolution of the polymer when combining is conducted at an elevated temperature. In some embodiments, thermally inducing phase separation is conducted at at least one temperature in a range from 5 to 300 (in some embodiments, in a range from 5 to 250, 5 to 200, 5 to 150, 15 to 300, 15 to 250, 15 to 200, 15 to 130, or even 25 to 110) ° C. below the combining temperature.

After inducing phase separation, at least a portion of the solvent may be removed, thereby forming a porous polymer matrix composite layer having a polymeric network structure and an indicator material distributed within the thermoplastic polymer network structure. Optionally, after in inducing phase separation, the solvent filled structure is stretched thereby forming a porous polymer matrix composite layer having a polymeric network structure, solvent, and particles distributed within the thermoplastic polymer network structure.

The solvent may be removed by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

In some embodiments, the first and second methods further comprises at least one of stretching or compressing the polymer matrix composite. That is, after inducing phase separation, the formed polymeric network structure may be stretched or compressed, for example, to tune the air flow resistance of the polymer matrix composite. Stretching or compression of the polymer matrix composite may be achieved, for example, by conventional calendaring or tentering processes known in the art.

In some embodiments, where the network structure is plastically deformed by at least a compressive force, vibratory energy may be imparted during the application of the compressive force. In some of these embodiments, the polymer composite is in the form of a strip of indefinite length, and the applying of a compressive force step is performed as the strip passes through a nip. A tensile loading may be applied during passage through such a nip. For example, the nip may be formed between two rollers, at least one of which applies the vibratory energy; between a roller and a bar, at least one of which applies the vibratory energy; or between two bars, at least one of which applies the vibratory energy. The applying of the compressive force and the vibratory energy may be accomplished in a continuous roll-to-roll fashion, or in a step-and-repeat fashion. In other embodiments, the applying a compressive force step is performed on a discrete layer between, for example, a plate and a platen, at least one of which applies the vibratory energy. In some embodiments, the vibratory energy is in the ultrasonic range (e.g., 20 kHz), but other ranges are considered to be suitable. For further details regarding plastically deforming the network structure, see co-pending application having U.S. Ser. No. 62/578,732, filed Oct. 30, 2017, the disclosure of which is incorporated by reference.

In some embodiments, polymer matrix composite described herein can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

In some embodiments of both the first and second methods, polymeric matrix composites described herein, have first and second planar, opposed major surfaces. In some embodiments, polymer matrix composites described herein, have first and second opposed major surfaces, wherein the first major surface is nonplanar (e.g., curved). Referring to FIG. 1, exemplary polymer matrix composite described herein 100 has first and second opposed major surfaces 101, 102. First major surface 101 is nonplanar.

Planar and nonplanar major surfaces can be provided, for example, by coating or extruding the slurry onto a patterned substrate (e.g., a liner, a belt, a mold, or a tool). Alternatively, for example, a die with a shaped slot can be used to form nonplanar surfaces during the coating or extrusion process. Alternatively, for example, the structure can be formed after the phase separation has occurred before, and/or after, the solvent is removed by molding or shaping the layer with a patterned tool.

In some embodiments of both the first and second methods, polymer matrix composites described herein, have first protrusions extending outwardly from the first major surface, and in some embodiments, second protrusions extending outwardly from the second major surface. In some embodiments, the first protrusions are integral with the first major surface, and in some embodiments, the second protrusions are integral with the second major surface. Exemplary protrusions include at least one of a post, a rail, a hook, a pyramid, a continuous rail, a continuous multi-directional rail, a hemisphere, a cylinder, or a multi-lobed cylinder. In some embodiments, the protrusions have a cross-section in at least one of a circle, a square, a rectangle, a triangle, a pentagon, other polygons, a sinusoidal, a herringbone, or a multi-lobe.

Figure 2:
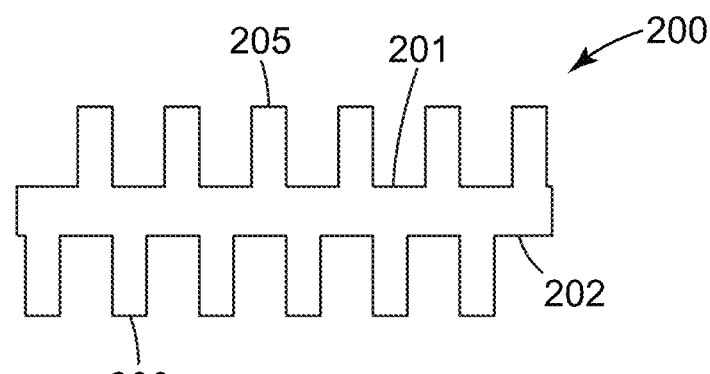
FIG. 2 is a schematic of another exemplary polymer matrix composite described herein.

Referring to FIG. 2, exemplary polymer matrix composite described herein 200 has first protrusions 205 extending outwardly from first major surface 201 and optional second protrusions 206 extending outwardly from second major surface 202.

Protrusions can be provided, for example, by coating or extruding between a patterned substrate (e.g., a liner, a belt, a mold, or a tool). Alternatively, a die with a shaped slot can be used to form protrusions during the coating or extrusion process. Alternatively, for example, the structure can be formed after the phase separation has occurred before, and/or after, the solvent is removed by molding or shaping the film between patterned tools.

Figure 3:
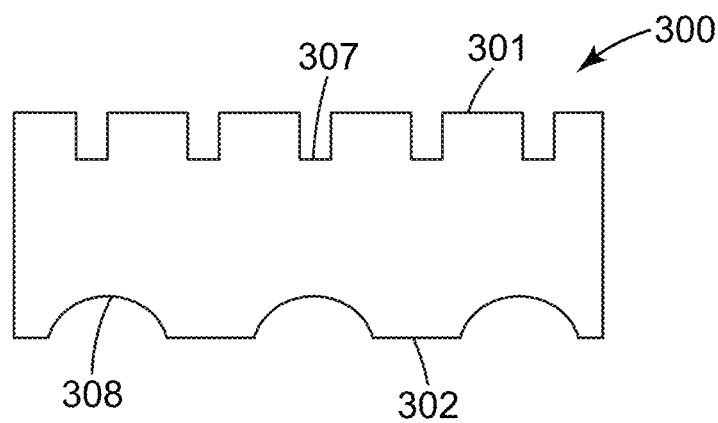
FIG. 3 is a schematic of another exemplary polymer matrix composite described herein.

In some embodiments of both the first and second methods, polymer matrix composites described herein have first depressions extending into the first major surface, and in some embodiments, second depressions extending into the second major surface. Exemplary depressions include at least one of a groove, a slot, an inverted pyramid, a hole (including a thru or blind hole), or a dimple. Referring to FIG. 3, exemplary polymer matrix composite described herein 300 has first depressions 307 extending into first major surface 301 and optional second depressions 308 extending into second major surface 302.

Depressions can be provided, for example, by coating or extruding between patterned substrate (e.g., a liner, a belt, a mold, or a tool). Alternatively, for example, a die with a shaped slot can be used to form depressions during the coating or extrusion process. Alternatively, for example, the structure can be formed after the phase separation has occurred before, and/or after, the solvent is removed by molding or shaping the film between patterned tools.

In some embodiments, polymer matrix composites described herein further comprise a reinforcement (e.g., attached to the polymer matrix composite, partial therein, and/or therein). Exemplary reinforcements include fibers, strands, nonwovens, woven materials, fabrics, mesh, and films. The reinforcement, for example, can be laminated to the polymer matrix composite thermally, adhesively, or ultrasonically. The reinforcement, for example, can be imbedded within the polymer matrix composite during the coating or extrusion process. The reinforcement, for example, can be between the major surfaces of the composite, on one major surface, or on both major surfaces. More than one type of reinforcement can be used.

Polymer matrix composites described herein can be used, for example, to detect at least one of the presence of a target material (e.g., an analyte (e.g., an organic analyte), a biologic, water, a halide, a protein, an amino acid, an amine, or an amino sugar), the absence of a target material, the amount of a target material, or the level of exposure to a target material.

In one more specific exemplary use of polymer matrix composites described herein, a sensor (e.g., end-of-service-life indicator for respirator cartridges, protein detection, pH indicator, or moisture indicator) comprises the polymer matrix composite described herein.

Further, for example, polymer matrix composites comprising indicator particles are useful, for example, as a sensor, detecting an analyte, light curing indicator, wetness indicator, markers for detecting and biological activity. Silver coated or silver patterned particles can be used, for example, as $H_2S$, HCl, and chlorine gas indicators. Gold nanopatterned particles can be used, for example, as a HCl gas indicator. Such indicators can be useful, for example, as end of service life indicators on respirator cartridges. Further details on indicators in general can be found, for example, U.S. Pat. No. 9,759,663 (Halverson et al.), U.S. Pat. No. 9,772,321 (Wendland et al.), U.S. Pat. No. 9,681,996 (Prioleau et al.), U.S. Pat. No. 9,738,919 (Mach et al.), the disclosures of which is incorporated herein by reference.

Further, for example, polymer matrix composites described herein comprising silver nitrate particles may be useful for introducing ions into water commonly used to extract halides:

$$Ag^+(aq)+X^-(aq) \rightarrow AgX(s)$$

where $X^-$, $=Cl^-$, $Br^-$, or $I^-$. The color of precipitate varies with the halide: white (silver chloride), pale yellow/cream (silver bromide), yellow (silver iodide).

Further, for example, an exemplary method of using the polymer matrix composite described herein to detect at least one of the presence of a target material (e.g., analyte), the absence of a target material, the amount of a target material, or the level of exposure to a target material, the method comprising:

providing the polymer matrix composite, wherein the indicator is an indicator for the target material;

contacting at least some of the indicator particles present in the polymer matrix composite with a material to be tested for the target material; and analyzing the contacted particles to determine at least one of the presence of a target material (e.g., match a color or approximate color change following exposure to the target material to a known color chart to verify the presence of the target material), the absence of a target material (e.g., match a color or approximate color change, if any, following exposure to the target material to a known color chart to verify the absence of the target material), the amount of a target material (e.g., measuring a color change following exposure to the target material and correlating the color change with the concentration of the target material), or the level of exposure to a target material (e.g., measuring a color change following exposure to the target material and correlating the color change with the level of exposure to the target material).

Polymer matrix composites described herein may also be part of a kit. For example, a kit may comprise a polymer matrix composite described herein (e.g., a chemical indicator test strip comprising a polymer matrix composite described herein) and instructions for use to determine at least one of the presence of a target analyte, the absence of a target material, the amount of a target analyte, or the level of exposure to a target analyte. The kit may further comprise at least one of a detector (e.g., a detector for presence or absence of nitrogen compounds, or presence of pathogens), a reader (e.g., a reader for fluorescence antibody concentration, blood sugar, or gas levels), a calibration chart (e.g., a calibration chart for color indicating pH, or color indicating metal ion content), a sample container (e.g., a sample container for a liquid, or gas, or a container comprising the indicator such as end of service life on a respirator cartridge, or for separating the sample), or a sample collector (e.g., a sample collector for holding the sample immobilized, or extracting the sample from the source, or separating the sample, a wipe or absorbent, a filter (e.g., syringe filter)).

For further details in general regarding indicators and uses thereof, see, for example, PCT Pub. Nos. WO 2009/006254 A1, published Jan. 8, 2009, and WO 2012/040032 A2, published Mar. 29, 2012, the disclosures of which are incorporated herein by reference.

EXEMPLARY EMBODIMENTS

1A. A polymer matrix composite comprising:
a porous polymeric network structure; and
a plurality of indicator particles distributed within the polymeric network structure, wherein the indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the indicator particles and the polymer (excluding any solvent), and wherein the polymer matrix composite has a density of at least 0.05 (in some embodiments, at 0.05 to 4 (in some embodiments, in a range from 0.05 to 4, 0.05 to 3, 0.05 to 2.5, 0.05 to 2, 0.05 to 1, or even 0.05 to 0.2) g/cm$^3$ uncompressed, as-made or at least 1 (in some embodiments, at least 4, or even at least 6; in some embodiments, in a range from 1 to 6, or even 4 to 6) g/cm$^3$ after compression.

2A. The polymer matrix composite of Exemplary Embodiment 1A, wherein the polymer matrix composite has a density in a range from 0.05 to 1 (in some embodiments, in a range from 0.05 to 3, 0.05 to 2.8, 0.05 to 2.5, 0.05 to 2, 0.05 to 1, or even 0.05 to 0.5) g/cm$^3$.

3A. The polymer matrix composite of any preceding A Exemplary Embodiment, wherein the polymer matrix composite has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

4A. The polymer matrix composite of any preceding A Exemplary Embodiment, wherein the indicator particles comprise first and second, different (i.e., different compositions or microstructures, or particle sizes) indicator particles.

5A. The polymer matrix composite of Exemplary Embodiment 4A, wherein the first indicator particles comprise color changing particles (e.g., phenolphthalein (pH indicator)), salts (e.g., cobalt chloride (moisture indicator), copper II sulfate (protein indicator)), lead acetate (hydrogen sulfide gas detector), metal (e.g., silver (hydrogen sulfide gas detector)), metal coated particles (e.g., silver coated particles (hydrogen sulfide gas detector)), zeolite, and activated carbon (chemical absorbing), and wherein the second indicator particles comprise color changing particles (e.g., phenolphthalein (pH indicator)), salts (e.g., cobalt chloride (moisture indicator), copper II sulfate (protein indicator)), lead acetate (hydrogen sulfide gas detector), metal (e.g., silver (hydrogen sulfide gas detector)), metal coated particles (e.g., silver coated particles (hydrogen sulfide gas detector), zeolite, and activated carbon (chemical absorbing).

6A. The polymer matrix composite of either Exemplary Embodiment 4A or 5A, wherein the first indicator particles have an average particle size (average length of longest dimension) in a range from 1 to 5000 (in some embodiments, in a range from 5 to 100, 10 to 50, or even, 20 to 40) micrometers and the second indicator particles have an average particle size (average length of longest dimension) in a range from 1 to 5000 (in some embodiments, in a range from 5 to 100, 10 to 50, or even, 20 to 40) micrometers.

7A. The polymer matrix composite of any of Exemplary Embodiments 4A to 6A, wherein the first indicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent and the second indicator particles are present in a range from 99 to 1 (in some embodiments, in a range from 95 to 1, 90 to 1, 95 to 2, 90 to 2, 75 to 2, 50 to 2, 40 to 2, 30 to 2, 20 to 2, 10 to 2, 7 to 2, or even 5 to 2) weight percent, based on the total weight of the first and second indicator particles.

8A. The polymer matrix composite of any of Exemplary Embodiments 1A to 3A, wherein the indicator particles comprise at least one of phenolphthalein, copper II sulfate, cobalt chloride, silver metal, silver coated particles, lead acetate, zeolite, or activated carbon.

9A. The polymer matrix composite of any of Exemplary Embodiments 1A to 3A or 8A, wherein the indicator particles polymeric particles have an average particle size (average length of longest dimension) in a range 1 to 5000 (in some embodiments, in a range from 5 to 100, 10 to 50, or even, 20 to 40) micrometers.

10A. The polymer matrix composite of any of Exemplary Embodiments 1A to 3A, 8A, or 9A, further comprising nonindicator particles.

11A. The polymer matrix composite of Exemplary Embodiment 10A, wherein the nonindicator particles comprise at least one of inorganic or organic material which do not provide a detectible change after exposure.

12A. The polymer matrix composite of either Exemplary Embodiment 10A or 11A, wherein the nonindicator particles have an average particle size (average length of longest dimension) in a range from 0.005 to 5000 (in some embodiments, in a range from 0.005 to 500, 0.1 to 200, or even 5 to 60) micrometers.

13A. The polymer matrix composite of any of Exemplary Embodiments 10A to 12A, wherein the nonindicator particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the polymer matrix composite.

14A. The polymer matrix composite of any preceding A Exemplary Embodiment, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

15A. The polymer matrix composite of any preceding A Exemplary Embodiment, wherein the porous polymeric network structure comprises a phase separated plurality of interconnected morphologies (e.g., at least one of fibrils, nodules, nodes, open cells, closed cells, leafy laces, strands, nodes, spheres, or honeycombs).

16A. The polymer matrix composite of any preceding A Exemplary Embodiment, wherein the porous polymeric network structure comprises a polymer having a number average molecular weight in a range from of $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol.

17A. The polymer matrix composite of any preceding A Exemplary Embodiment, wherein the polymer matrix composite is in the form of a layer having a thickness in a range from 50 to 7000 micrometers.

18A. The polymer matrix composite of any preceding A Exemplary Embodiment, wherein the porous polymeric network structure is produced by an induced phase separation of a miscible thermoplastic polymer-solvent solution.

19A. The polymer matrix composite of Exemplary Embodiment 18A, wherein induced phase separation is at least one of thermally induced phase separation and solvent induced phase separation.

20A. The polymer matrix composite of any preceding A Exemplary Embodiment, having first and second planar, opposed major surfaces.

21A. The polymer matrix composite of any preceding A Exemplary Embodiment, having first and second opposed major surfaces, wherein the first major surface is nonplanar (e.g., curved or protrusions with no planar surface therebetween).

22A. The polymer matrix composite of either Exemplary Embodiment 20A or 21A, wherein the first major surface has first protrusions extending outwardly from the first major surface. In some embodiments, the protrusions are integral with the first major surface.

23A. The polymer matrix composite of Exemplary Embodiment 22A, wherein the first protrusions are at least one of a post, a rail, a hook, a pyramid, a continuous rail, a continuous multi-directional rail, a hemisphere, a cylinder, or a multi-lobed cylinder.

24A. The polymer matrix composite of any of Exemplary Embodiments 20A to 23A, wherein the first major surface has first depressions extending into the first major surface.

25A. The polymer matrix composite of Exemplary Embodiment 24A, wherein the first depressions are at least one of a groove, a slot, an inverted pyramid, a hole (including a thru or blind hole), or a dimple.

26A. The polymer matrix composite of any of Exemplary Embodiments 22A to 25A, wherein the second major surface has second protrusions extending outwardly from the second major surface.

27A. The polymer matrix composite of Exemplary Embodiment 26A, wherein the second protrusions are at least one of a post, a rail, a hook, a pyramid, a continuous rail, a continuous multi-directional rail, a hemisphere, a cylinder, or a multi-lobed cylinder.

28A. The polymer matrix composite of any of Exemplary Embodiments 22A to 27A, wherein the second major surface has second depressions extending into the second major surface.

29A. The polymer matrix composite of Exemplary Embodiment 28A, wherein the second depressions are at least one of a groove, a slot, an inverted pyramid, a hole (including a thru or blind hole), or a dimple.

30A. The polymer matrix composite of any preceding A Exemplary Embodiment, further comprising a reinforcement (e.g., attached to the polymer matrix composite, partial therein, and/or therein).

31A. The polymer matrix composite of any preceding A Exemplary Embodiment, that can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

32A. The polymer matrix composite of any preceding A Exemplary Embodiment, comprising at least one of a viscosity modifier (e.g., fumed silica, block copolymers, and wax), a plasticizer, a thermal stabilizer (e.g., such as available, for example, under the trade designation "IRGANOX 1010" from BASF, Ludwigshafen, Germany), an antimicrobial (e.g., silver and quaternary ammonium), a flame retardant, an antioxidant, a dye, a pigment, or an ultraviolet (UV) stabilizer.

1B. A method of making the polymer matrix composite of any preceding A Exemplary Embodiment, the method comprising:

combining (e.g., mixing or blending) a thermoplastic polymer, a solvent, and a plurality of indicator particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

2B. The method of Exemplary Embodiment 1B, further comprising removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100 percent by weight of the solvent, based on the weight of the solvent in the formed article) of the solvent from the formed article after inducing phase separation of the thermoplastic polymer from the solvent.

3B. The method of Exemplary Embodiment 2B, wherein at least 90 percent by weight of the solvent, based on the weight of the solvent in the formed article, is removed, wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent.

4B. The method of Exemplary Embodiment 3B, wherein the article has first and second major surfaces with ends perpendicular to the first and second major surfaces, and where the ends are unrestrained during the solvent removal.

5B. The method of either Exemplary Embodiment 3B or 4B, wherein the formed article after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent.

6B. The method of Exemplary Embodiment 1B, wherein no solvent is removed from the formed article (even after inducing phase separation of the thermoplastic polymer from the solvent).

7B. The method of any preceding B Exemplary Embodiment, wherein inducing phase separation includes thermally induced phase separation.

8B. The method of any preceding B Exemplary Embodiment, wherein the polymer in the slurry has a melting point, wherein the solvent has a boiling point, and wherein combining is conducted below the melting point of the polymer in the slurry, and below the boiling point of the solvent.

9B. The method of any preceding B Exemplary Embodiment, wherein the polymer in the slurry has a melting point, and wherein inducing phase separation is conducted at less than the melting point of the polymer in the slurry.

10B. The method of any preceding B Exemplary Embodiment, further comprising at least one of stretching or compressing the polymer matrix composite.

11B. The method of any of Exemplary Embodiments 1B to 9B, further comprising applying vibratory energy to the polymer matrix composite simultaneously with the applying a compressive force.

12B. The method of any preceding B Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

13B. The method of any preceding B Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

14B. The method of any preceding B Exemplary Embodiment, wherein the porous polymeric network structure is produced by an induced phase separation of a miscible thermoplastic polymer-solvent solution.

15B. The method of Exemplary Embodiment 14B, wherein inducing phase separation includes thermally induced phase separation.

1C. A method of making the polymer matrix composite of any preceding A Exemplary Embodiment, the method comprising:

combining (e.g., mixing or blending) a thermoplastic polymer, a solvent for the thermoplastic polymer, and a plurality of indicator particles to form a suspension of indicator particles in a miscible thermoplastic polymer-solvent solution;

inducing phase separation of the thermoplastic polymer from the solvent; and removing at least a portion of the solvent to provide the polymer matrix composite.

2C. The method of Exemplary Embodiment 1C, wherein inducing phase separation includes at least one of thermally induced phase separation or solvent induced phase separation.

3C. The method of Exemplary Embodiment 1C, wherein the polymer in the miscible thermoplastic polymer-solvent solution has a melting point, wherein the solvent has a boiling point, and wherein combining is conducted above the melting point of the miscible thermoplastic polymer-solvent solution, and below the boiling point of the solvent.

4C. The method of any preceding C Exemplary Embodiment, wherein the polymer in the miscible thermoplastic polymer-solvent solution has a melting point, and wherein inducing phase separation is conducted at less than the melting point of the polymer in the miscible thermoplastic polymer-solvent solution.

5C. The method of any preceding C Exemplary Embodiment, further comprising at least one of stretching or compressing the polymer matrix composite.

6C. The method of any of Exemplary Embodiments 1C to 4C, further comprising applying vibratory energy to the polymer matrix composite simultaneously with the applying a compressive force.

7C. The method of any preceding C Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

8C. The method of any preceding C Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

1D. A sensor (e.g., end-of-service life indicator for respirator cartridges, protein detector, pH indicator, or moisture indicator) comprising the polymer matrix composite of any preceding A Exemplary Embodiment.

2D. A device comprising the sensor of Exemplary Embodiment 1D.

1E. A method of using the polymer matrix composite of any preceding A Exemplary Embodiment to detect at least one of the presence of a target material, the absence of a target material, the amount of a target material, or the level of exposure to a target material, the method comprising:

providing the polymer matrix composite, wherein the indicator is an indicator for the target material;

contacting at least some of the indicator particles present in the polymer matrix composite with a material to be tested for the target material; and analyzing the contacted particles to determine at least one of the presence of a target material, the absence of a target material, the amount of a target material, or the level of exposure to a target material.

1F. A kit comprising the polymer matrix composite of any preceding A Exemplary Embodiment.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Air Flow Resistance Test

Air flow resistance was measured using a densometer (obtained as Model 4110 from Gurley Precision Instruments, Troy, N.Y.) with a timer (obtained as Model 4320 from Gurley Precision Instruments). A sample was clamped in the tester. The timer and photo eye were reset and the cylinder was released, allowing air to pass through a 1 square inch (6.5 cm$^2$) circle with a constant force of 4.88 inches (12.4 cm) of water (1215 N/m$^2$). The time to pass 50 mL of air was recorded. The air flow resistance was normalized to that of a 500-micrometer thick film by dividing by the layer thickness in micrometers and multiplying by 500 micrometers. Layer thickness was measured as described in the "Density and Porosity Test."

Bubble Point Pressure Test

Bubble point pressure is a commonly used technique to characterize the largest pore in a porous membrane. Discs 47 mm in diameter were cut and samples soaked in mineral oil to fully fill and wet out the pores within the sample. The wet samples were then placed in a holder (47 mm; Stainless Holder Part #2220 from Pall Corporation, Port Washington, N.Y.). Pressure was slowly increased on the top of the sample using a pressure controller and gas flow was measured on the bottom with a gas flow meter. The pressure was recorded when there was a significant increase in flow from the baseline flow rate. This was reported as the bubble point pressure pounds per square inch (psi) (centimeters of mercury, cm Hg or Pascals, Pa). This technique was a modification to ASTM F316-03 (2006), "Standard Test Methods for Pore Size Characteristics of Membrane Filters by Bubble Point and Mean Flow Pore Test," the disclosure of which is incorporated herein by reference and included an automated pressure controller and flow meter to quantify when the bubble point pressure had been reached. The pore size was calculated per the ASTM using the following equation:

Limiting Pore Diameter (μm)=(Surface Tension in dynes/cm*0.415)/(Pressure in psi).

The factor of 0.415 was included since the pressure was in units of psi. A surface tension of 34.7 dynes/cm was used for the mineral oil.

Density and Porosity Test

The density of a sample was calculated using a method similar to ASTM F-1315-17 (2017), "Standard Test Method for Density of a Sheet Gasket Material," the disclosure of which is incorporated herein by reference, by cutting a 47 mm diameter disc, weighing the disc on an analytical balance of suitable resolution (typically 0.0001 gram), and measuring the thickness of the disc on a thickness gauge (obtained as Model 49-70 from Testing Machines, Inc., New Castle, Del.) with a dead weight of 7.3 psi (50.3 KPa) and a flat anvil of 0.63 inch (1.6 cm) diameter, with a dwell time of about 3 seconds and a resolution of +/−0.0001 inch. The density was then calculated by dividing the mass by the volume, which was calculated from the thickness and diameter of the sample. With the known densities and weight fractions of the components of the polymer matrix composite, the theoretical density of the polymer matrix composite was calculated by the rule of mixtures. Using the theoretical density and the measured density, the porosity was calculated as:

Porosity=[1−(measured density/theoretical density)]×100.

Example 1

A 120-milliliter (4-ounce) glass jar was charged with 1.5 gram of an ultra-high molecular weight polyethylene (UHMWPE) (obtained under the trade designation "GUR-2126" from Celanese Corporation, Irving, Tex.), and 74.0 grams of calcium sulfate desiccant particles (obtained under the trade designation "DRIERITE DESICCANT-ANHYDROUS INDICATING DRIERITE" (Stock #23001) from W. A. Hammond Drierite Company LTD, Xenia, Ohio) that were hand crushed to a powder with a mortar and pestle, and shook with an acoustic mixer (obtained under the trade designation "LABRAM RESONATACOUSTIC MIXER" from Resodyn Inc., Butte, Mont.) at 70% intensity for 1 minute. 25.0 grams of a low odor kerosene (obtained from Alfa Aesar, Ward Hill, Mass.) was added to this mixture and stirred by hand with a spatula until a uniform slurry was obtained. The slurry was applied with a scoop at room temperature (about 25° C.) to a 3-mil (75-micrometer) heat stabilized polyethylene terephthalate (PET) liner (obtained under the trade designation "COATED PET ROLL #33716020500" from 3M Company), then a 3 mil (75 micrometer) heat stabilized PET liner ("COATED PET ROLL #33716020500") was applied on top to sandwich the slurry. The slurry was then spread between the PET liners by using a notch bar set to a gap of 76 mils (1930 micrometers). The notch bar rails were wider than the PET liner to obtain an effective wet film thickness of about 70 mils (1930 micrometers). Progressive multiple passes with increasing downward pressure of the notch bar were used to flatten the slurry. The sandwiched, formed slurry was placed on an aluminum tray and placed in a lab oven (obtained under the trade designation "DESPATCH RFD1-42-2E" from Despatch, Minneapolis, Minn.), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After solvent evaporation, the polymer matrix composite was removed from the oven, allowed to cool to ambient temperature, and characterized.

The resulting polymer matrix composite was 69.4 mils (1.76 millimeter) thick had a density of 1.18 g/cm$^3$ immediately after solvent evaporation (prior to allowing any ambient moisture absorption) (as determined by the "Density and Porosity Test"), the density was 1.26 g/cm$^3$ after being allowed to equilibrate in the ambient humidity, the density was 1.38 g/cm$^3$ after becoming fully saturated with liquid water, and had a Gurley airflow of 38.6 sec/50 cm$^3$ (as determined by the "Air Flow Resistance Test") immediately after solvent evaporation.

The polymer matrix composite layer film was light blue color when dry, and turned off white to a pinkish hue after being allowed to equilibrate in the ambient humidity and finally being saturated with liquid water. The moisture absorption and color change of this polymer matrix composite was reversible upon drying and rewetting.

Example 2

Example 2 was prepared as described for Example 1, except the calcium sulfate desiccant particles ("DRIERITE DESICCANT-ANHYDROUS INDICATING DRIERITE") were replaced with 23.0 grams of amino acid L-Lysine monohydrochloride particles (obtained under the trade designation "L-LYSINE MONOHYDROCHLORIDE, L-5626" from Sigma, Saint Louis, Mo.) and 2 grams of phenophthalein particles (obtained under the trade designation "PHENOPHTHALEIN, PX0520-1" from EMD Chemicals Inc., Gibbstown, N.J.) were added, and 24 grams of the low odor kerosene was used to make the slurry. The notch bar gap was set to 36 mils (914.4 micrometers).

The resulting polymer matrix composite was 31.1 mils (0.79 millimeter) thick. The polymer matrix composite had a density of 0.62 g/cm$^3$, a pore size of 4.2 micrometers (as determined by "Bubble Point Pressure Test") and a Gurley airflow of 19.0 sec/50 cm$^3$ air.

The polymer matrix composite layer was white in color and turned to a red hue when exposed to water with a pH greater than 8 (0.1N potassium hydroxide).

Example 3

Example 3 was prepared as described for Example 2, except 20.0 grams of amino acid L-Lysine monohydrochloride particles ("L-LYSINE MONOHYDROCHLORIDE, L-5626") were used and the phenolphthalein particles were omitted. 26 grams of the low odor kerosene were used to make the slurry.

The resulting polymer matrix composite was 29.6 mils (0.75 millimeter) thick. The polymer matrix composite had a density of 0.62 g/cm$^3$, and a Gurley airflow of 21.0 sec/50 cm$^3$ air.

Figure 4:
FIGS. 4 and 5 show scanning electron microscope (SEM) micrographs of cross-sections of exemplary polymer matrix composites (Examples 2 and 4, respectively) described herein.

Referring to FIG. 4, a scanning electron microscope (SEM) digital image of a cross-section of the Example 2 polymer matrix composite with leafy lace binder 401, phenolphthalein 402, and L-Lysine monohydrochloride 403) taken with a SEM (obtained under the trade designation "PHENOM" from FEI Company, Hillsboro, Oreg.) is shown. The cross-sectional sample was prepared by liquid nitrogen freeze fracturing followed by gold sputter coating with a sputter coater (obtained under the trade designation "EMITECH K550X" from Quorum Technologies, Laughton East Sussex, England).

The polymer matrix composite layer was white in color and did not change color when exposed to water with a pH greater than 8.

Example 4

Example 4 was prepared as described for Example 1, except the calcium sulfate desiccant particles ("DRIERITE DESICCANT-ANHYDROUS INDICATING DRIERITE") were replaced with 8.0 grams of low density glass bubbles (obtained under the trade designation "3M GLASS BUBBLES K1" from 3M Company), and coated as described for the Examples of U.S. Pat. No. 8,698,394 (McCutcheon et al.), the disclosure of which is incorporated herein by reference and 42 grams of the low odor kerosene was used. The notch bar gap was set to 36 mils (914.4 micrometers).

The resulting polymer matrix composite was 29.6 mils (0.75 millimeter) thick. The polymer matrix composite had a density of 0.09 g/cm$^3$, a pore size of 4.1 micrometers, and a Gurley airflow of 5.9 sec/50 cm$^3$ air.

Figure 5:
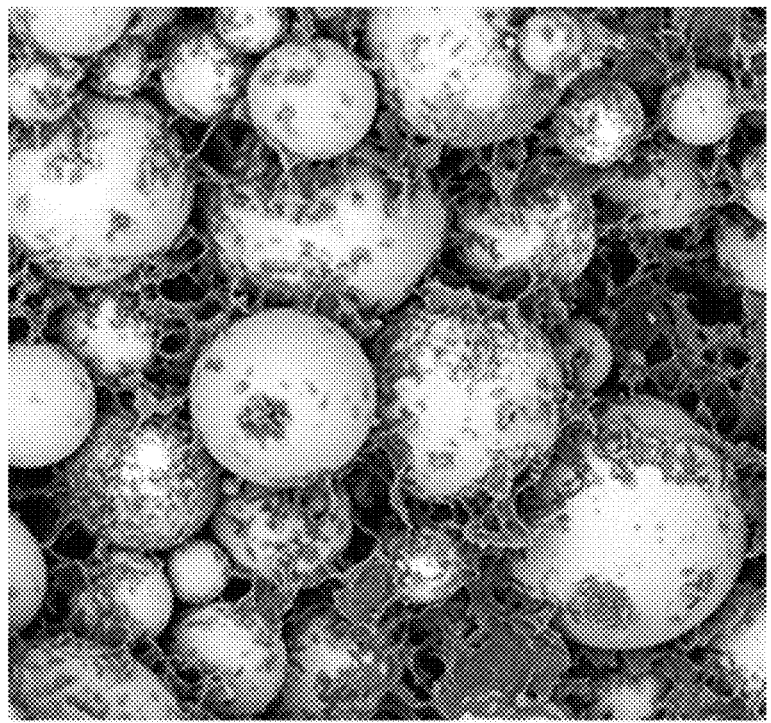

Referring to FIG. 5, a scanning electron microscope (SEM) digital image of a cross-section of the Example 4 polymer matrix composite is shown.

Example 5

Example 5 was prepared as described for Example 1, except the calcium sulfate desiccant particles ("DRIERITE DESICCANT-ANHYDROUS INDICATING DRIERITE") were replaced with 117.0 grams of zinc sulfide phosphorescent particles (obtained under the trade designation "NATURAL GREEN EMITTING 6SSU" from United Mineral &

Chemical Corporation, Lyndhurst, N.J.), and 30 grams of the low odor kerosene were used. The notch bar gap was set to 36 mils (914.4 micrometers).

The resulting polymer matrix composite was 34.1 mils (0.87 millimeter) thick. The polymer matrix composite had a density of 1.85 g/cm$^3$, and a Gurley airflow of 3.0 sec/50 cm$^3$ air.

The resulting polymer matrix composite was exposed to normal office lights. The lights were then turned off and the sample glowed.

Example 6

Example 6 was prepared as described for Example 5, except a wet-laid resin bond nonwoven web (obtained under the trade designation "UNIBLEND 135" from Midwest Filtration Corporation, Cincinnati, Ohio) was placed on the bottom liner where the slurry was imbibed into the nonwoven leaving a smooth top surface after the top liner was removed. The bottom surface of the polymer matrix composite was course from the imprints of the nonwoven as the slurry bled through.

The resulting polymer matrix composite was 34.6 mils (0.88 millimeter) thick. The polymer matrix composite had a density of 1.37 g/cm$^3$, and a Gurley airflow of 7.1 sec/50 cm$^3$ air.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymer matrix composite comprising:
   a porous polymeric network; and
   a plurality of indicator particles distributed within the porous polymeric network,
   wherein the indicator particles are present in a range from 1 to 99 weight percent, based on the total weight of the indicator particles and the polymeric network; wherein the polymer matrix composite has a density of at least 0.05 g/cm$^3$,
   wherein the volume ratio of the plurality of indicator particles to polymer is at least 9:1, and
   wherein the indicator particles provide a detectible change in at least one of optical, ultraviolet or infrared properties after exposure to a target material.

2. The polymer matrix composite of claim 1, wherein the polymer matrix composite has a porosity of at least 5 percent.

3. The polymer matrix composite of claim 1, wherein the polymer matrix composite has a density in a range from 0.05 to 4 g/cm$^3$.

4. The polymer matrix composite of claim 1, wherein the indicator particles comprise at least one of phenolphthalein, copper 11 sulfate, cobalt chloride, silver metal, silver coated particles, lead acetate, or zeolite.

5. The polymer matrix composite of claim 1, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

6. The polymer matrix composite of claim 1, wherein the porous polymeric network structure comprises a phase-separated plurality of interconnected morphologies.

7. A method of making the polymer matrix composite of claim 1, the method comprising:
   combining a thermoplastic polymer, a solvent, and the plurality of indicator particles to provide a slurry;
   forming the slurry in to an article;
   heating the article in an environment to retain at least 90 percent by weight of the solvent in the article, based on the weight of the solvent in the article, and solubilize at least 50 by weight percent of the thermoplastic polymer, based on the total weight of the thermoplastic polymer; and
   inducing phase separation of the thermoplastic polymer from the solvent to provide the polymer matrix composite.

8. The method of claim 7, further comprising removing at least a portion of the solvent from the formed article after inducing phase separation of the thermoplastic polymer from the solvent.

9. The method of claim 7, wherein no solvent is removed from the formed article.

10. The method of claim 7, wherein inducing phase separation includes thermally induced phase separation.

11. The method of claim 7, wherein the polymer in the slurry has a melting point, wherein the solvent has a boiling point, and wherein combining is conducted below the melting point of the polymer in the slurry, and below the boiling point of the solvent.

12. The method of claim 7, wherein the polymer in the slurry has a melting point, and wherein inducing phase separation is conducted at less than the melting point of the polymer in the slurry.

13. The method of claim 7, further comprising at least one of stretching or compressing the polymer matrix composite.

14. The method of claim 13, further comprising applying vibratory energy to the polymer matrix composite simultaneously with the applying a compressive force.

15. A method of making the polymer matrix composite of claim 1, the method comprising:
   combining a thermoplastic polymer, a solvent for the thermoplastic polymer is soluble in, and a plurality of indicator particles to form a suspension of indicator particles in a miscible thermoplastic polymer-solvent solution;
   inducing phase separation of the thermoplastic polymer from the solvent; and
   removing at least a portion of the solvent to provide the polymer matrix composite.

16. The method of claim 15, wherein inducing phase separation includes at least one of thermally induced phase separation or solvent induced phase separation.

17. The method of claim 16, wherein the polymer in the miscible thermoplastic polymer-solvent solution has a melting point, wherein the solvent has a boiling point, and wherein combining is conducted above the melting point of the miscible thermoplastic polymer-solvent solution, and below the boiling point of the solvent.

18. The method of claim 15, wherein the polymer in the miscible thermoplastic polymer-solvent solution has a melting point, and wherein inducing phase separation is conducted at less than the melting point of the polymer in the miscible thermoplastic polymer-solvent solution.

19. The method of claim 15, further comprising at least one of stretching or compressing the polymer matrix composite.

20. The method of claim 15, further comprising applying vibratory energy to the polymer matrix composite simultaneously with the applying a compressive force.

21. A method of using the polymer matrix composite of claim 1 to detect at least one of the presence of a target material, the absence of a target material, the amount of a target material, or the level of exposure to a target material, the method comprising:
- providing the polymer matrix composite, wherein the indicator is an indicator for the target material;
- contacting at least some of the indicator particles present in the polymer matrix composite with a material to be tested for the target material; and
- analyzing the contacted particles to determine at least one of the presence of a target material, the absence of a target material, the amount of a target material, or the level of exposure to a target material.

* * * * *

UNITED STATES PATENT AND TRADEMARK OFFICE
CERTIFICATE OF CORRECTION

| | |
|---|---|
| PATENT NO. | : 10,913,834 B2 |
| APPLICATION NO. | : 16/191572 |
| DATED | : February 9, 2021 |
| INVENTOR(S) | : Derek Dehn |

It is certified that error appears in the above-identified patent and that said Letters Patent is hereby corrected as shown below:

In the Claims

Column 25
Line 39, Claim 1, after "the" insert -- porous --.
Line 55, Claim 4, delete "11" and insert -- II --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*